United States Patent
Sato

(10) Patent No.: US 10,139,883 B2
(45) Date of Patent: Nov. 27, 2018

(54) RESET SIGNAL GENERATION CIRCUIT

(71) Applicant: ALPINE ELECTRONICS, INC., Shinagawa-ku, Tokyo (JP)

(72) Inventor: Hideaki Sato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 76 days.

(21) Appl. No.: 15/385,019

(22) Filed: Dec. 20, 2016

(65) Prior Publication Data

US 2017/0235354 A1 Aug. 17, 2017

(30) Foreign Application Priority Data

Feb. 11, 2016 (JP) .................................. 2016-024211

(51) Int. Cl.
*G06F 1/28* (2006.01)
*H02M 3/158* (2006.01)

(52) U.S. Cl.
CPC .............. *G06F 1/28* (2013.01); *H02M 3/158* (2013.01)

(58) Field of Classification Search
CPC .... G06F 1/28; G06F 1/24; G06F 1/30; H03K 17/22; H03K 17/223; G05F 1/00
See application file for complete search history.

(56) References Cited

U.S. PATENT DOCUMENTS

| 5,070,295 | A | * | 12/1991 | Morigami | H03K 17/22 323/314 |
| 5,778,238 | A | * | 7/1998 | Hofhine | H03K 17/223 327/143 |
| 6,147,521 | A | * | 11/2000 | Degoirat | G01R 19/16519 327/206 |
| 6,370,643 | B1 | * | 4/2002 | Kubo | G06F 1/24 307/85 |
| 7,030,668 | B1 | * | 4/2006 | Edwards | H03K 17/223 327/143 |
| 8,653,865 | B2 | * | 2/2014 | Utsuno | G06F 1/28 327/143 |
| 2003/0174002 | A1 | * | 9/2003 | Slamowitz | H03K 17/223 327/143 |

FOREIGN PATENT DOCUMENTS

JP H1131956 2/1999

* cited by examiner

*Primary Examiner* — Jaweed A Abbaszadeh
*Assistant Examiner* — Brian J Corcoran
(74) *Attorney, Agent, or Firm* — Brinks Gilson & Lione

(57) ABSTRACT

A power system includes a voltage detection IC which outputs a reset signal to a microcomputer when an input voltage is equal to or lower than a reset release voltage, releases outputting of the reset signal when the input voltage exceeds the reset release voltage, and outputs the reset signal to the microcomputer again after the input voltage exceeds the reset release voltage when the input voltage is equal to or lower than a reset detection voltage which is lower than the reset release voltage and a voltage conversion circuit which sets a first voltage associated with a change of a power voltage as the input voltage before start of operation of the microcomputer and sets a second voltage which is associated with a change of the power voltage and is lower than the first voltage as the input voltage after the start of operation the microcomputer.

16 Claims, 2 Drawing Sheets

RESET SIGNAL GENERATION CIRCUIT

RELATED APPLICATION

The present application claims priority to Japanese Patent Application Number 2016-024211, filed Feb. 11, 2016, the entirety of which is hereby incorporated by reference.

BACKGROUND

1. Field of the Invention

The present invention relates to a reset signal generation circuit which outputs a reset signal at the time of a voltage being decreased to a processing device which operates according to a voltage applied from a power circuit.

2. Description of the Related Art

In the related art, there have been known reset signal generation circuits having a configuration capable to continue resetting until a power voltage reaches a higher voltage at the time of being powered on and capable of preventing resetting until the power voltage becomes a low voltage to an extent that operation is not hindered at the time of the power voltage being decreased (for example, refer to JP 11-31956 A). In the reset signal generation circuit, when the power voltage exceeds a first voltage (reset release voltage), outputting of a reset signal is stopped, and after that, when the power voltage is equal to or lower than a second voltage (reset detection voltage) which is lower than the first voltage, the reset signal is output again. In this manner, a voltage which generates the reset signal is allowed to have hysteresis, and thus, it is possible for a processing device such as an LSI to secure stable operations.

In the reset signal generation circuit disclosed in JP 11-31956 A described above, the first and second voltages are set in a range which is higher than an operation guarantee voltage of the processing device and is lower than the power voltage in a normal operation period. However, recently, the power voltage becomes a low voltage (for example, 3.3 V), and thus, if a variation of the power circuit is considered, there is a tendency that the range becomes narrow. On the other hand, with respect to a difference between first and second threshold voltages, if stability of operation is considered, a certain value needs to be secured. For this reason, when the first voltage is set to be included in a range which is higher than the operation guarantee voltage of the processing device and is lower than the power voltage in the normal operation period, the second voltage is lower than the operation guarantee voltage, and thus, there is a problem in that the operation may not be stable. For example, in the case where the power voltage is lower than the operation guarantee voltage and, after that, is increased again to exceed the operation guarantee voltage, since a result of a process in the time period when the power voltage is lower than the operation guarantee voltage is reflected on the following process, abnormal operation or malfunction occurs.

SUMMARY

The present disclosure is to provide a reset signal generation circuit capable of stabilizing operation of a processing device even in the case where a power voltage becomes a low voltage.

In order to solve the problem, a reset signal generation circuit according to the present disclosure includes: a reset signal generation unit which outputs a reset signal to a processing device when an input voltage is equal to or lower than a reset release voltage, releases outputting of the reset signal when the input voltage exceeds the reset release voltage, and outputs the reset signal to the processing device again after the input voltage exceeds the reset release voltage when the input voltage is equal to or lower than a reset detection voltage which is lower than the reset release voltage; and a voltage conversion unit which sets a first voltage associated with a change of a power voltage as the input voltage before start of operation of the processing device and sets a second voltage which is associated with a change of the power voltage and is lower than the first voltage as the input voltage after the start of operation of the processing device.

After the start of operation of the processing device, comparison with the reset detection voltage is performed by using the second voltage associated with a change of the power voltage, so that the reset detection voltage can be substantially shifted to a high-potential side. Therefore, even in the case where the power voltage becomes a low voltage, it is possible to heighten the power voltage at the time when the second voltage is lower than the reset release voltage to an extent that the operation of the processing device can be stabilized.

In addition, it is desirable that before the start of operation of the processing device, when the first voltage is equal to the reset release voltage, the power voltage corresponding to the first voltage is higher than an operation guarantee voltage of the processing device. In addition, it is desirable that after the start of operation of the processing device, when the second voltage is equal to the reset detection voltage, the power voltage corresponding to the second voltage is higher than an operation guarantee voltage of the processing device. Therefore, even in the case where power voltage becomes a low voltage, it is possible to reliably perform the reset release or the reset detection on the processing device in a range that the power voltage is higher than the operation guarantee voltage.

In addition, it is desirable that before the start of operation of the processing device, when the first voltage is equal to the reset release voltage, the power voltage corresponding to the first voltage is lower than a lower limit of a variation of the power voltage generated in a normal operation period of a plurality of power circuits. In addition, it is desirable that after the start of operation of the processing device, when the second voltage is equal to the reset detection voltage, the power voltage corresponding to the second voltage is lower than a lower limit of a variation of the power voltage generated in a normal operation period of a plurality of power circuits. Therefore, in the case where the power voltage becomes a low voltage, although there is a variation in manufacturing of the power circuit, it is possible to reliably perform the reset release or the reset detection on the processing device in a range that the power voltage is lower than the power voltage generated in a normal operation period of the power circuit.

In addition, it is desirable that the voltage conversion unit is configured by using a voltage divider circuit which changes a voltage division ratio before the start of operation of the processing device and a voltage division ratio after the start of operation of the processing device, and the first and second voltages are generated by the voltage divider circuit dividing the power voltage. In this manner, the voltage conversion unit is configured by using the voltage divider circuit, so that it is possible to simplify the configuration of the voltage conversion unit.

In addition, it is desirable that the voltage division ratio of the voltage divider circuit corresponding to the second voltage is set to have a value smaller than the voltage division ratio of the voltage divider circuit corresponding to the first voltage. Therefore, with respect to the first and second voltages associated with a change of the power voltage, it is possible to easily generate the second voltage which is lower than the first voltage.

In addition, it is desirable that changing of the voltage division ratio is performed by turning on/off a switching element connected in parallel to a resistor included in the voltage divider circuit. Therefore, it is possible to change the voltage division ratio of the voltage divider circuit by a simple configuration.

In addition, it is desirable that the reset signal generation unit and the voltage conversion unit are configured by using one integrated circuit. Therefore, it is possible to simplify the manufacturing process, and it is possible to prevent an increase in labor of assembling parts or in production cost.

In addition, it is desirable that the voltage conversion unit is configured as a separate part with respect to an integrated circuit including the reset signal generation unit. The voltage conversion unit as a separate part may be added, so that it is easy to change design, and thus, it is possible to prevent an increase in cost required for changing design.

DETAILED DESCRIPTION OF THE PREFERRED EMBODIMENTS

Hereinafter, a power system according to an embodiment of the present invention will be described with reference to the drawings.

Figure 1:
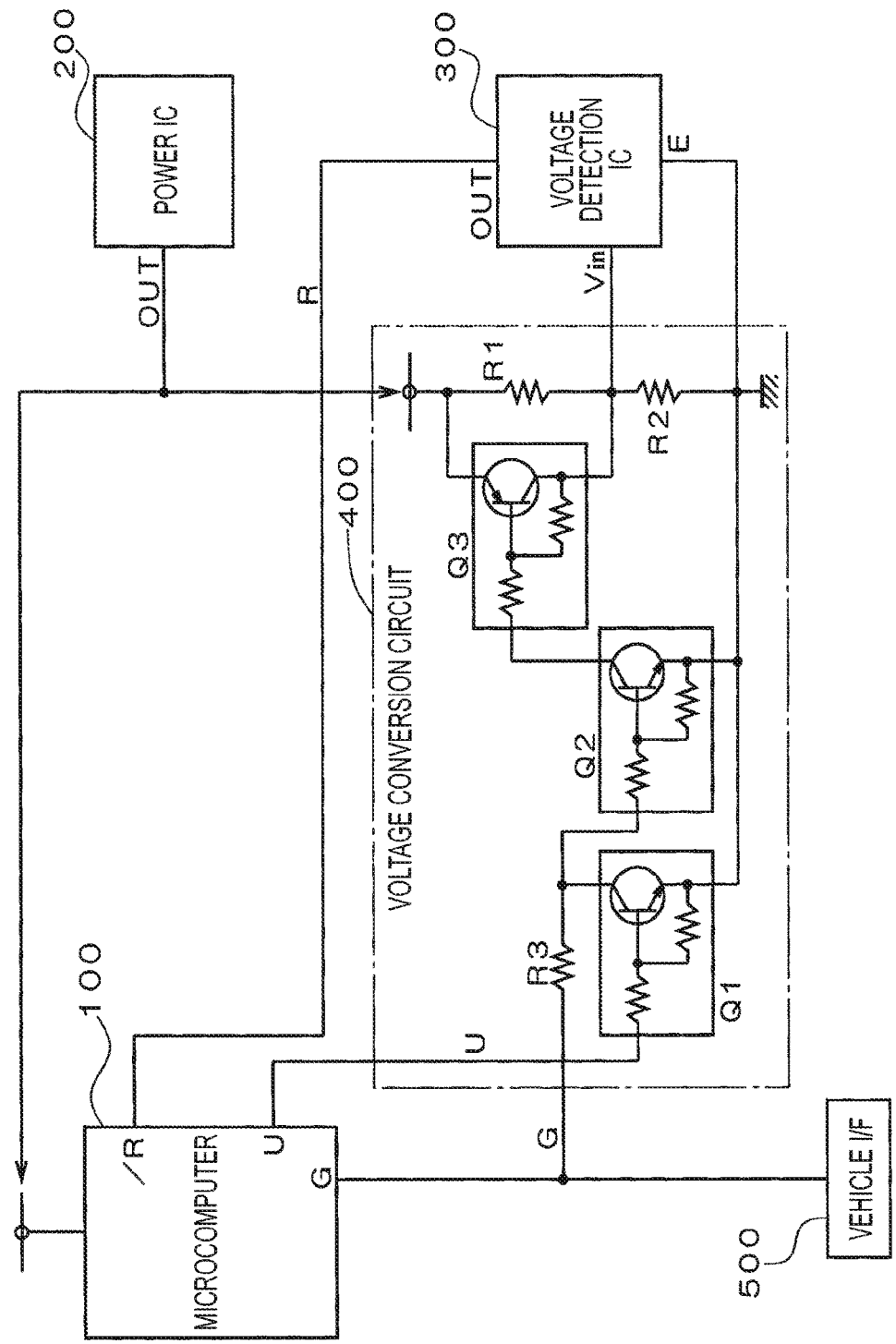
FIG. 1 is a diagram illustrating a configuration of a power system according to an embodiment.

FIG. 1 is a diagram illustrating a configuration of the power system according to the embodiment. As illustrated in FIG. 1, the power system according to the embodiment is configured to include a microcomputer 100, a power IC 200, a voltage detection IC 300, a voltage conversion circuit 400, and a vehicle interface circuit (vehicle I/F) 500. The power system is mounted on, for example, a vehicle.

The microcomputer 100 is a processing device which operates in synchronization with an operation clock signal and performs various types of operations by executing a predetermined program. The microcomputer 100 is provided with a reset terminal R to which a reset signal R is input, an input terminal G to which a G signal is input, and an output terminal U which outputs a U signal. The reset signal R is a signal for resetting operations of the microcomputer 100. When a low-level reset signal R is input to the reset terminal R, the operation of the microcomputer 100 is reset. When the reset signal R becomes a high level, the reset operation is released, and the microcomputer 100 is activated. The G signal is a signal indicating validation/invalidation of the operation of the microcomputer 100, and for example, a high level and a low level correspond to "validation" and "invalidation", respectively. The U signal is a signal for notifying an external device that the microcomputer 100 is operating after activation, and a high level and a low level correspond to "operating" and "stopped", respectively.

The power IC 200 is a power circuit which generates a predetermined power voltage (operation voltage) which is to be supplied to the microcomputer 100 or other electronic devices. For example, the power IC 200 is connected to a battery (not shown) mounted on the vehicle to generate a power voltage of 3.3 V in a stable operation period. The generated power voltage is supplied from an output terminal OUT through a power line to the microcomputer 100 or the like.

The voltage detection IC 300 is provided with a terminal Vin to which an input voltage is applied, a ground terminal E, and a terminal OUT which outputs the reset signal R. When the input voltage applied to the terminal Vin is equal to or lower than the reset release voltage, the voltage detection IC 300 outputs the reset signal R from the terminal OUT to the reset terminal R of the microcomputer 100 (sets the reset signal R to be at a low level). When the input voltage exceeds the reset release voltage, the voltage detection IC 300 releases the output of the reset signal R (sets the reset signal R to be at a high level). After the input voltage exceeds the reset release voltage, when the input voltage is equal to or lower than the reset detection voltage which is lower than the reset release voltage, the voltage detection IC 300 outputs the reset signal to the reset terminal R of the microcomputer 100 again. In the related art, the power voltage generated by the power IC 200 is directly applied to the terminal Vin. However, in the embodiment, the first and second voltages generated on the basis of the power voltage by the voltage conversion circuit 400 are applied as the input voltages to the terminal Vin. The voltage detection IC 300 corresponds to a reset signal generation unit.

The voltage conversion circuit 400 generates first and second voltages associated with a change of the power voltage generated by the power IC 200. For example, the power voltage is set as the first voltage, and the divided voltage of the power voltage is set as the second voltage.

As illustrated in FIG. 1, the voltage conversion circuit 400 is configured to include three resistors R1, R2, and R3 and three transistors Q1, Q2, and Q3.

The voltage divider circuit is configured with a resistor R1 and a resistor R2. One terminal of the voltage divider circuit is connected to the power line, the other terminal thereof is grounded, and a connection point of the resistors R1 and R2 is connected to the terminal Vin of the voltage detection IC 300. In addition, the resistor R1 as one resistor (in the power line side) of the voltage divider circuit is connected in parallel between a collector and an emitter of the transistor Q3 (emitter is in the power line side). When the transistor Q3 as a switching element is turned on, two ends of the one resistor R1 constituting the voltage divider circuit are short-circuited, the power voltage appearing on the power line is directly applied as the input voltage to the terminal Vin of the voltage detection IC. In addition, when the transistor Q3 is turned off, the voltage divided from the power voltage appearing on the power line by the voltage divider circuit configured with the resistors R1 and R2 is applied as the input voltage to the terminal Vin of the voltage detection IC 300.

With respect to the transistor Q1, the base is connected to the output terminal U of the microcomputer 100, the emitter is grounded, and the G signal is input through the resistor R3 to the collector. In addition, with respect to the transistor Q2, the collector is connected to the base of the transistor Q3, the emitter is grounded, and the G signal is input through the resistor R3 to the base. The voltage conversion circuit 400 corresponds to a voltage conversion unit.

The vehicle interface circuit 500 is a circuit for transmitting the G signal generated by an external device (not shown) such as an engine control device to the input terminal G of the microcomputer 100. The vehicle interface circuit may be provided inside the external device. Alternatively, the vehicle interface circuit may be provided separately from the external device. For example, when an accessory switch ACC is turned on, the G signal is generated.

Figure 2:
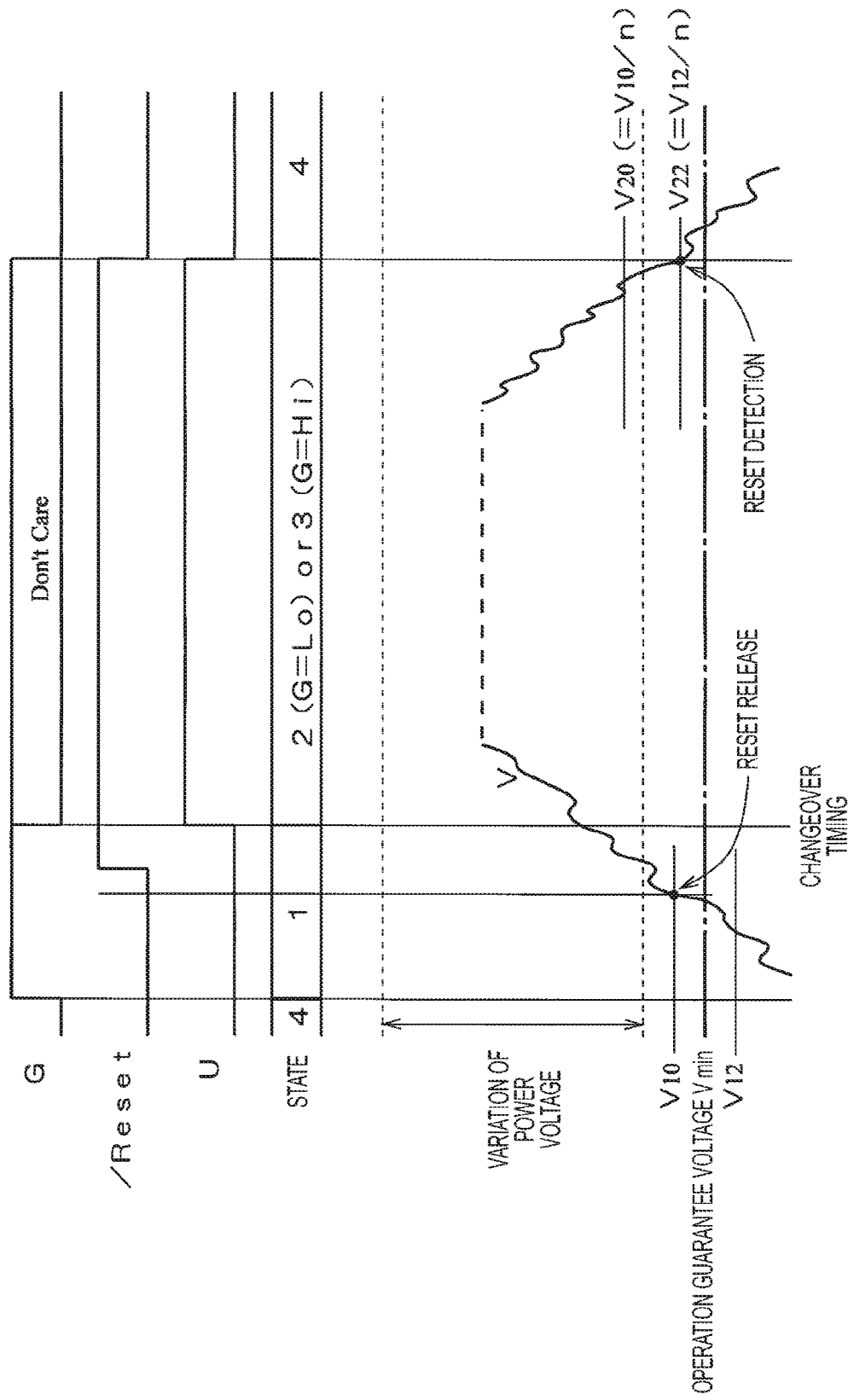
FIG. 2 is a diagram illustrating reset signal generation operations at an operation start time and an operation end time of a power IC.

The power system according to the embodiment has the above-described configuration, and the operations thereof are described. FIG. 2 is a diagram illustrating reset signal generation operations at an operation start time and an operation end time of a power IC 200. In FIG. 2, "V" is the power voltage generated by the power IC 200, the vertical axis denotes the voltage value, and the horizontal axis denotes an elapsed time. In addition, "G" denotes the G signal which is input from the vehicle interface circuit 500 to the voltage conversion circuit 400 or the input terminal G of the microcomputer 100. "/Reset" denotes the reset signal R which is output from the terminal OUT of the voltage detection IC 300 and input to the reset terminal R of the microcomputer 100. "U" denotes the U signal which is output from the output terminal U of the microcomputer 100 and input to the voltage conversion circuit 400.

In addition, "state" denotes an internal state of the voltage conversion circuit 400 defined by a combination of the G signal and the U signal. There are states 1 to 4, and the details thereof are as follows.

State 1: the G signal is at a high level, the U signal is at a low level, the transistor Q1 is turned off, the transistor Q2 is turned on, and the transistor Q3 is turned on.

State 2: the G signal is at a low level, the U signal is at a high level, the transistor Q1 is turned off, the transistor Q2 is turned off, and the transistor Q3 is turned off.

State 3: the G signal is at a high level, the U signal is at a high level, the transistor Q1 is turned on, the transistor Q2 is turned on, and the transistor Q3 is turned off.

State 4: G signal is at a low level, the U signal is at a low level, the transistor Q1 is turned off, the transistor Q2 is turned off, and the transistor Q3 is turned on.

(Operations after Power-on)

For example, if the power IC 200 starts operations by turning on an accessory switch ACC, the power voltage V is gradually increased. At this time, only the G signal is at a high level, and since the microcomputer 100 is in the before-start-of-operation state, the U signal is at a low level (State 1). Namely, the transistor Q3 of the voltage conversion circuit 400 is turned on, so that the power voltage V (first voltage) appearing on the power line is directly applied to the terminal Vin of the voltage detection IC 300. In this state, the power voltage V is gradually increased to exceed the operation guarantee voltage Vmin. In addition, if the power voltage further exceeds the reset release voltage (V10) and a predetermined delay time is elapsed, the reset signal R output from the terminal OUT of the voltage detection IC 300 is changed from the current low level (reset state) to the high level (reset release state). Accordingly, if the microcomputer 100 starts operation, the high-level U signal is output from the output terminal U, so that the state is changed to State 2 or State 3.

In some cases, after the power voltage V is gradually increased to exceed the operation guarantee voltage Vmin, the power voltage V may be temporarily lower than the operation guarantee voltage Vmin. However, since the reset detection voltage (V12) is set to a value lower than the reset release voltage (V10), the reset release state is maintained.

After that, the operation of the power IC 200 is stabilized, and thus, the power voltage is maintained constant. However, the value of the power voltage varies to some extent due to a variation of components of the power IC 200 itself, influence of peripheral components connected to the power IC 200, or the like. In the embodiment, the reset release voltage V10 is a value which is lower than a minimum value (for example, a lower limit of the power voltages of a plurality of the power ICs 200 measured through inspection or the like in manufacturing is used) of the variation of the power voltage and is higher than the operation guarantee voltage Vmin.

(Operations at Time of Power-Off)

In the case where the microcomputer 100 is operating and the operation of the power IC 200 is stable, in State 2 or State 3, in the voltage conversion circuit 400, the transistor Q3 is turned off. Therefore, the voltage (second voltage) divided from the power voltage V by the voltage divider circuit (voltage division ratio n (<1)) configured with the resistors R1 and R2 is applied to the terminal Vin of the voltage detection IC 300.

As described above, in the voltage detection IC 300, if the input voltage exceeds V10 that is the reset release voltage, the reset release is performed (outputting of the reset signal is stopped). If the input voltage is lower than V12 that is the reset detection voltage, the reset detection is performed (outputting of the reset signal is started). Therefore, if the power voltage is V, the divided voltage output from the voltage divider circuit becomes nV. If the case where the divided voltage becomes equal to V12 that is the reset detection voltage is considered, the relationship of nV=V12 is satisfied. From this formula, V=V12/n. Since n has a value lower than 1, V12/n has a value higher than V12. Similarly, with respect to V10 that is the reset release voltage, V10/n has a value higher than V10. In FIG. 2, V12/n is denoted by V22, and V10/n is denoted by V20.

After that, for example, if the power IC 200 stops operation by turning off the accessory switch ACC, the power voltage V starts to be gradually decreased. Furthermore, if the power voltage V is decreased to be lower than V22 that is the reset detection voltage, the reset signal R (low level) is output from the reset terminal R of the voltage detection IC 300, so that the state is changed to State 4.

In this manner, in the power system according to the embodiment, after the start of operation of the microcomputer 100, comparison with the reset detection voltage V12 is performed by using the second voltage (divided voltage of the power voltage) associated with a change of the power voltage, so that the reset detection voltage can be substantially shifted to a high-potential side (V12→V22). Therefore, even in the case where the power voltage becomes a low voltage, it is possible to heighten the power voltage at the time when the second voltage is lower than the reset release voltage to an extent that the operation of the microcomputer 100 can be stabilized.

In addition, a power voltage equal to the reset release voltage V10 corresponding to the before-start-of-operation state of the microcomputer 100 or a power voltage equal to the reset detection voltage V22 corresponding to the after-start-of-operation state of the microcomputer 100 is set to have a value higher than the operation guarantee voltage Vmin of the microcomputer 100. Therefore, even in the case where power voltage becomes a low voltage, it is possible to reliably perform the reset release or the reset detection on the microcomputer 100 in a range that the power voltage is higher than the operation guarantee voltage.

In addition, the power voltage equal to the reset release voltage V10 corresponding to the before-start-of-operation state of the microcomputer 100 or the power voltage equal to the reset detection voltage V22 corresponding to the after-start-of-operation state of the microcomputer 100 is set to have a value lower than a lower limit of the variation of the power voltage generated in a normal operation period of a plurality of the power ICs 200. Therefore, in the case where the power voltage becomes a low voltage, although there is a variation in manufacturing of the power IC 200, it is possible to reliably perform the reset release or the reset detection on the microcomputer 100 in a range that the power voltage is lower than the power voltage generated in a normal operation period of the power IC 200.

In addition, the voltage conversion circuit 400 is configured by using the voltage divider circuit, so that it is possible to simplify the configuration of the voltage conversion circuit 400. In addition, the voltage division ratio n (<1) of the voltage divider circuit corresponding to the second voltage applied from the voltage conversion circuit 400 to the terminal Vin of the voltage detection IC 300 before the start of operation of the microcomputer 100 is set to be smaller than the voltage division ratio (transistor Q3 is turned on, and the power voltage itself becomes the first voltage, so that the voltage division ratio n=1) of the voltage divider circuit corresponding to the first voltage applied from the voltage conversion circuit 400 to the terminal Vin of the voltage detection IC 300 before the start of operation of the microcomputer 100. Therefore, with respect to the first and second voltages associated with a change of the power voltage, it is possible to easily generate the second voltage which is lower than the first voltage. In addition, the changing of the voltage division ratio in the first and second voltages is performed by turning on/off the transistor Q3 as a switching element connected in parallel to the resistor R1 included in the voltage divider circuit, and it is possible to change the voltage division ratio of the voltage divider circuit by a simple configuration.

In addition, the voltage conversion circuit 400 is configured as a separate part with respect to the voltage detection IC 300, and thus, in the case of using the voltage detection IC 300 which has been used in the related art, the voltage conversion circuit 400 as a separate part may be added. Therefore, it is easy to change design, and thus, it is possible to prevent an increase in cost required for changing design.

The present invention is not limited to the above-described embodiment, but various changes are available within the scope of the present invention. For example, in the above-described embodiment, the configuration of generating the reset signal which is to be input to the reset terminal R of the microcomputer 100 is described, but the processing device for inputting the reset signal may be a device other than the microcomputer 100.

In addition, in the above-described embodiment, the voltage conversion circuit 400 is provided separately from the voltage detection IC 300, but a function of the voltage conversion circuit 400 may be embedded in the voltage detection IC 300 or a function of the voltage detection IC 300 and a function of the voltage conversion circuit 400 may be embedded in the power IC 200. Therefore, it is possible to simplify the manufacturing process, and it is possible to prevent an increase in labor of assembling parts or in production cost.

In addition, in the voltage conversion circuit 400 according to the embodiment described above, the power voltage is allowed to be applied as the first voltage to the terminal Vin of the voltage detection IC 300 by short-circuiting the two ends of the resistor R1 by turning on the transistor Q3. However, the first and second voltages may be generated by connecting a serial circuit configured with a transistor Q3 and a resistor in parallel to the resistor R1 and by setting the voltage division ratios so as to be different when the transistor Q3 is turned on/off.

In addition, in the above-described embodiment, the voltage conversion circuit 400 is configured by using the voltage divider circuit configured with the resistors R1 and R2 and the transistor Q3. However, the resistors or transistor may not necessarily be used, and any other configurations where the ratios (voltage division ratios in the case of the voltage divider circuit) between the power voltage and the first and second voltages are allowed to be different may be used.

In addition, in the above-described embodiment, the power system mounted on a vehicle is described. However, the present invention may be applied to a power system used for devices other than vehicles.

As described above, according to the present disclosure, after the start of operation of the processing device, comparison with the reset detection voltage is performed by using the second voltage associated with a change of the power voltage, so that the reset detection voltage can be substantially shifted to a high-potential side. Therefore, even in the case where the power voltage becomes a low voltage, it is possible to heighten the power voltage at the time when the second voltage is lower than the reset release voltage to an extent that the operation of the processing device can be stabilized.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A reset signal generation circuit comprising:
    a reset signal generation unit which outputs a reset signal to a processing device when an input voltage is equal to or lower than a reset release voltage, releases outputting of the reset signal when the input voltage exceeds the reset release voltage, and outputs the reset signal to the processing device again after the input voltage exceeds the reset release voltage when the input voltage is equal to or lower than a reset detection voltage which is lower than the reset release voltage; and
    a voltage conversion unit which sets a first voltage associated with a change of a power voltage as the input voltage before start of operation of the processing device and sets a second voltage which is associated with a change of the power voltage and is lower than the first voltage as the input voltage after the start of operation of the processing device;
    wherein the voltage conversion unit is configured by using a voltage divider circuit which changes a voltage division ratio before the start of operation of the processing device and a voltage division ratio after the start of operation of the processing device, and
    wherein the first and second voltages are generated by the voltage divider circuit dividing the power voltage.

2. The reset signal generation circuit according to claim 1, wherein before the start of operation of the processing device, when the first voltage is equal to the reset release voltage, the power voltage corresponding to the first voltage is higher than an operation guarantee voltage of the processing device.

3. The reset signal generation circuit according to claim 1, wherein after the start of operation of the processing device, when the second voltage is equal to the reset detection voltage, the power voltage corresponding to the second voltage is higher than an operation guarantee voltage of the processing device.

4. The reset signal generation circuit according to claim 1, wherein before the start of operation of the processing device, when the first voltage is equal to the reset release voltage, the power voltage corresponding to the first voltage is lower than a lower limit of a variation of the power voltage generated in a normal operation period of a plurality of power circuits.

5. The reset signal generation circuit according to claim 1, wherein after the start of operation of the processing device, when the second voltage is equal to the reset detection voltage, the power voltage corresponding to the second voltage is lower than a lower limit of a variation of the power voltage generated in a normal operation period of a plurality of power circuits.

6. The reset signal generation circuit according to claim 1, wherein the voltage division ratio of the voltage divider circuit corresponding to the second voltage is set to have a value smaller than the voltage division ratio of the voltage divider circuit corresponding to the first voltage.

7. The reset signal generation circuit according to claim 1, wherein changing of the voltage division ratio is performed by turning on/off a switching element connected in parallel to a resistor included in the voltage divider circuit.

8. The reset signal generation circuit according to claim 1, wherein the reset signal generation unit and the voltage conversion unit are configured by using one integrated circuit.

9. The reset signal generation circuit according to claim 1, wherein the voltage conversion unit is configured as a separate part with respect to an integrated circuit including the reset signal generation unit.

10. A method of generating a reset signal for a processing device comprising:
outputting a reset signal to the processing device when an input voltage is equal to or lower than a reset release voltage, releasing outputting of the reset signal when the input voltage exceeds the reset release voltage, and outputting the reset signal to the processing device again after the input voltage exceeds the reset release voltage when the input voltage is equal to or lower than a reset detection voltage which is lower than the reset release voltage; and
setting a first voltage associated with a change of a power voltage as the input voltage before start of operation of the processing device and setting a second voltage which is associated with a change of the power voltage and is lower than the first voltage as the input voltage after the start of operation of the processing device;
wherein a voltage divider circuit changes a voltage division ratio before the start of operation of the processing device and a voltage division ratio after the start of operation of the processing device, and the first and second voltages are generated by the voltage divider circuit dividing the power voltage.

11. The method according to claim 6, wherein before the start of operation of the processing device, when the first voltage is equal to the reset release voltage, the power voltage corresponding to the first voltage is higher than an operation guarantee voltage of the processing device.

12. The method according to claim 6, wherein after the start of operation of the processing device, when the second voltage is equal to the reset detection voltage, the power voltage corresponding to the second voltage is higher than an operation guarantee voltage of the processing device.

13. The method according to claim 6, wherein before the start of operation of the processing device, when the first voltage is equal to the reset release voltage, the power voltage corresponding to the first voltage is lower than a lower limit of a variation of the power voltage generated in a normal operation period of a plurality of power circuits.

14. The method according to claim 6, wherein after the start of operation of the processing device, when the second voltage is equal to the reset detection voltage, the power voltage corresponding to the second voltage is lower than a lower limit of a variation of the power voltage generated in a normal operation period of a plurality of power circuits.

15. The method according to claim 6, wherein the voltage division ratio of the voltage divider circuit corresponding to the second voltage is set to have a value smaller than the voltage division ratio of the voltage divider circuit corresponding to the first voltage.

16. The method according to claim 6, wherein changing of the voltage division ratio is performed by turning on/off a switching element connected in parallel to a resistor included in the voltage divider circuit.

* * * * *